(12) United States Patent
Ishishita

(10) Patent No.: US 7,102,310 B2
(45) Date of Patent: Sep. 5, 2006

(54) COOLING DEVICE OF POWER SUPPLY

(75) Inventor: Teruo Ishishita, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/108,881

(22) Filed: Apr. 19, 2005

(65) Prior Publication Data

US 2005/0269994 A1    Dec. 8, 2005

(30) Foreign Application Priority Data

Jun. 2, 2004  (JP) .............................. 2004-164821

(51) Int. Cl.
 *H01M 10/50* (2006.01)
(52) U.S. Cl. .................. 318/268; 318/471; 320/150
(58) Field of Classification Search ................ 318/268, 318/471; 388/909, 934; 320/150
See application file for complete search history.

(56) References Cited

U.S. PATENT DOCUMENTS

| | | | | |
|---|---|---|---|---|
| 5,795,664 A * | 8/1998 | Kelly | ............................. | 429/7 |
| 6,204,639 B1 * | 3/2001 | Takano et al. | .............. | 320/150 |
| 6,411,063 B1 * | 6/2002 | Kouzu et al. | ............... | 320/150 |
| 6,422,027 B1 * | 7/2002 | Coates et al. | ............... | 62/259.2 |
| 6,495,991 B1 * | 12/2002 | Yuasa et al. | ................ | 320/150 |
| 6,819,085 B1 * | 11/2004 | Kimoto | ...................... | 320/150 |
| 6,903,534 B1 * | 6/2005 | Minamiura | ................. | 320/150 |

FOREIGN PATENT DOCUMENTS

| EP | 1 309 029 A2 | 5/2003 |
|---|---|---|
| JP | 11-111349 | 4/1999 |
| JP | 2003-142167 | 5/2003 |
| JP | 2003-178815 | 6/2003 |
| JP | 2004-006412 | 1/2004 |

* cited by examiner

*Primary Examiner*—Bentsu Ro
(74) *Attorney, Agent, or Firm*—Kenyon & Kenyon LLP

(57) ABSTRACT

An ECU executes a program including the steps of detecting a temperature TB of each battery block, calculating a desired output value VT of each motor based on a detected temperature, detecting output value V of each motor based on a signal transmitted from an F/V conversion circuit converting a pulse signal of a speed sensor provided on each motor into a voltage, reading a last DUTY command value D, calculating a difference DV between desired output value VT and output value V (DV=VT−V), calculating a DUTY command correction value for each motor based on difference DV, and adding a calculated DUTY command correction value to last DUTY command value D to calculate DUTY command value D.

8 Claims, 6 Drawing Sheets

COOLING DEVICE OF POWER SUPPLY

This nonprovisional application is based on Japanese Patent Application No. 2004-164821 filed with the Japan Patent Office on Jun. 2, 2004, the entire contents of which are hereby incorporated by reference.

BACKGROUND OF THE INVENTION

1. Field of the Invention

The present invention relates to a cooling device of a power supply, more specifically, to a cooling device of a power supply formed with a plurality of electricity storage blocks.

2. Description of the Background Art

In recent years, attention has been given to a vehicle which runs with driving force from a motor, such as a hybrid vehicle, a fuel cell vehicle or an electric vehicle, as one of measures to protect the environment. On such vehicle, a battery storing power for supply to the motor is mounted. A battery pack, formed by connecting a plurality of cells in series to form a module and then connecting a plurality of modules in series, is used as the battery. Though a high voltage (several hundred volts) is required to drive the vehicle, a voltage per one cell is low (for example, about 1.2 volts). Therefore, a total number of series-connected cells forming the battery becomes large and thus a size of the battery is increased. Therefore, in a vehicle having severe limitation of a space for mounting, the modules (cells) forming the battery are sometimes divided into a plurality of battery blocks. Each of the battery blocks is mounted in a separate location of the vehicle. Respective battery blocks are connected in series to form the battery. On the other hand, since the battery produces heat due to charging and discharging of power, it must be cooled. Therefore, for the battery formed with a plurality of separately mounted battery blocks, cooling of each battery block is required.

Japanese Patent Laying-Open No. 2003-142167 publication discloses a cooling device of a battery pack system formed with a plurality of battery pack blocks (battery blocks). The cooling device described in Japanese Patent Laying-Open No. 2003-142167 publication includes a temperature detection unit and a cooling fan provided on each battery pack block, and a control unit controlling each cooling fan by selecting any one of a plurality of control maps and, when a difference in temperatures of an arbitrary battery pack block and another battery pack block becomes larger than a threshold value, changing the control map for the cooling fan of the battery pack block for controlling. When the temperature detected is higher than a minimum temperature by at least a predetermined value, the control map for the cooling fan of the battery pack block is changed to a control map having a higher cooling capability. A volume of air supplied from the cooling fan is set based on the detected temperature and the control map.

According to the cooling device described in this publication, the control map for the cooling fan of a high-temperature battery pack block can be changed to the control map having a higher cooling capability to increase the volume of air supplied from the cooling fan of the high-temperature battery pack block. With this, a difference in temperatures of battery pack blocks can be decreased to make degradation speeds uniform to prolong an overall life.

It is to be noted that, though the volume of air supplied from the cooling fan sometimes deviates from a set value due to an effect of a pressure loss or the like, there is no description in Japanese Patent Laying-Open No. 2003-142167 publication as to how to drive the cooling fan to attain the volume of air as it is set. Therefore, the difference in temperatures may not be decreased because the volume of air supplied from the cooling fan may be different from the set value.

SUMMARY OF THE INVENTION

An object of the present invention is to decrease a difference in temperatures of blocks.

Another object of the present invention is to rapidly approximate a driving voltage of a motor to a desired value.

A cooling device of a power supply according to an aspect of the present invention is formed with a plurality of electricity storage blocks. The cooling device includes a plurality of cooling fans respectively provided corresponding to the electricity storage blocks to supply a cooling medium to the electricity storage blocks, a plurality of motors respectively driving the cooling fans, a temperature detection unit detecting a temperature of each of the electricity storage blocks, a calculation unit calculating a desired value of a driving voltage of each of the motors based on the temperature of each of the electricity storage blocks detected, a rotation number detection unit detecting a rotation number of each of the motors, an operation unit performing an operation of a calculated value of the driving voltage of each of the motors based on the rotation number detected, and a control unit controlling each of the motors based on a difference between the desired value and the calculated value.

According to the present invention, the cooling medium is supplied to each electricity storage block formed with a plurality of electricity storage cells from each of the plurality of cooling fans respectively provided corresponding to the electricity storage blocks. Each cooling fan is driven by the motor. A temperature of each electricity storage block is detected with the temperature detection unit and, based on the temperature detected, a desired value of a driving voltage of each motor is calculated with the calculation unit. A rotation number of each motor is detected with the rotation number detection unit and, based on each rotation number detected, a calculated value of the driving voltage of each motor is obtained by an operation of the operation unit. With this, the calculated value indicating an actual driving voltage of each motor can be obtained from the operation using the rotation number. As a result, the actual driving voltage of each motor can be detected more accurately as compared with measurement of the driving voltage input to the motor using a voltmeter or the like. Each motor is controlled by the control unit based on a difference between the calculated value and desired value. With this, each motor can be controlled such that the actual driving voltage of the motor becomes equal to the desired value of the driving voltage. Therefore, each electricity storage block can be appropriately cooled according to the temperature thereof. As a result, a cooling device of a power supply can be provided which can accurately manage a temperature of each electricity storage block to eliminate a difference in temperatures of electricity storage blocks.

The control unit preferably controls each of the motors to make the driving voltage of each of the motors higher when the difference between the desired value and the calculated value is larger.

According to the present invention, the driving voltage of each of the motors is made higher when the difference between the desired value and the calculated value is larger.

With this, the driving voltage of the motor can be approximated to the desired value rapidly when the difference between the desired value and the calculated value is large.

More preferably, the cooling device suppresses the driving voltage of at least one of the motors provided corresponding to an electricity storage block having a temperature lower than at least one remaining electricity storage block of the plurality of electricity storage blocks.

According to the present invention, the driving voltage of at least one of the motors which is provided corresponding to the electricity storage block having a temperature lower than at least one remaining electricity storage block of the plurality of electricity storage blocks is suppressed. With this, cooling of the electricity storage block having a relatively low temperature can be suppressed. As a result, the difference in temperatures of the electricity storage blocks can be decreased.

More preferably, the cooling device increases the driving voltage of at least one of the motors provided corresponding to an electricity storage block having a temperature higher than at least one remaining electricity storage block of the plurality of electricity storage blocks.

According to the present invention, the driving voltage of at least one of the motors which is provided corresponding to the electricity storage block having a temperature higher than at least one remaining electricity storage block of the plurality of electricity storage blocks is increased. With this, cooling of the electricity storage block having a relatively high temperature can be enhanced. As a result, the difference in temperatures of the electricity storage blocks can be decreased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
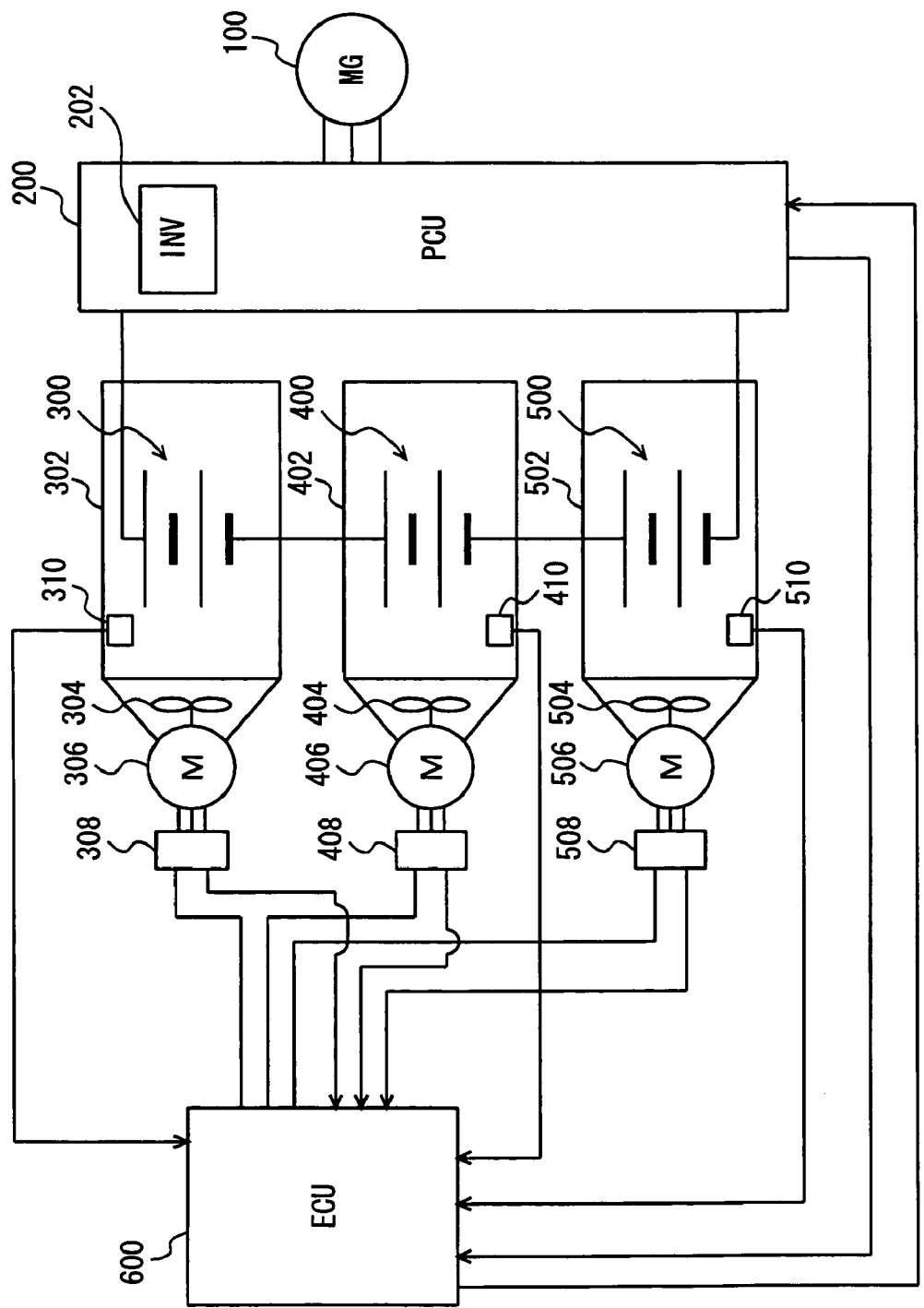
FIG. 1 is a control block diagram of a vehicle having a cooling device of a power supply according to a first embodiment of the present invention mounted thereon.

Embodiments of the present invention will now be described referring to the drawings. In the description below, the same parts are indicated with the same characters. Since they have the same names and functions, detailed descriptions thereof will not be repeated.

First Embodiment

Referring to FIG. 1, a vehicle is described which has a cooling device of a power supply according to a first embodiment of the present invention mounted thereon. The vehicle includes a motor generator 100, a PCU (Power Control Unit) 200, battery blocks 300, 400 and 500, and an ECU (Electronic Control Unit) 600. It is to be noted that, a number of battery blocks is not limited to three and may be any number more than one. In addition, a capacitor may be substituted for a battery. Furthermore, total numbers of electricity storage cells forming respective battery blocks may be the same or different from each other. The battery blocks are connected in series. These battery blocks form a power supply.

The vehicle is a hybrid vehicle which is driven or has an engine (not shown) assisted by driving force from motor generator 100. It is to be noted that, the vehicle may be a fuel cell vehicle or an electric vehicle besides the hybrid vehicle.

Motor generator 100 is a three-phase electrical machine. Power supplied to motor generator 100 is controlled by PCU 200. DC power supplied from battery blocks 300, 400 and 500 is converted into AC power with an inverter 202 of PCU 200 and is supplied to motor generator 100. With this, the vehicle is driven or the engine is assisted using the driving force from motor generator 100. It is to be noted that, a DC/DC converter may be used to increase a voltage.

During regenerative braking of the vehicle, motor generator 100 is driven with rotation of a wheel (not shown) and operates as a generator. AC power generated in motor generator 100 is converted into DC power with inverter 202 of PCU 200 and is stored in each battery block. PCU 200 is controlled by ECU 600.

Each of battery blocks 300, 400 and 500 is a battery pack which is formed by connecting a plurality of electricity storage cells in series to form a module and then connecting a plurality of modules in series. Battery blocks 300, 400 and 500 are placed in cases 302, 402 and 502, respectively. Each battery block produces heat due to charging and discharging of power. Therefore, cooling fans 304, 404 and 504 are provided on respective battery blocks to supply cooling air. Each battery block is cooled by a heat exchange with the cooling air.

The cooling fans are driven by respective motors 306, 406 and 506. Motors 306, 406 and 506 are three-phase electrical machines. Power supplied to the motors is controlled with cooling fan circuits 308, 408 and 508, respectively.

Each of the cooling fan circuits is controlled by ECU 600. A signal representing a temperature detected by each of temperature sensors 310, 410 and 510 provided on respective battery blocks is transmitted to ECU 600. ECU 600 controls each cooling fan circuit based on a transmitted signal to equalize temperatures of the battery blocks.

Figure 2:
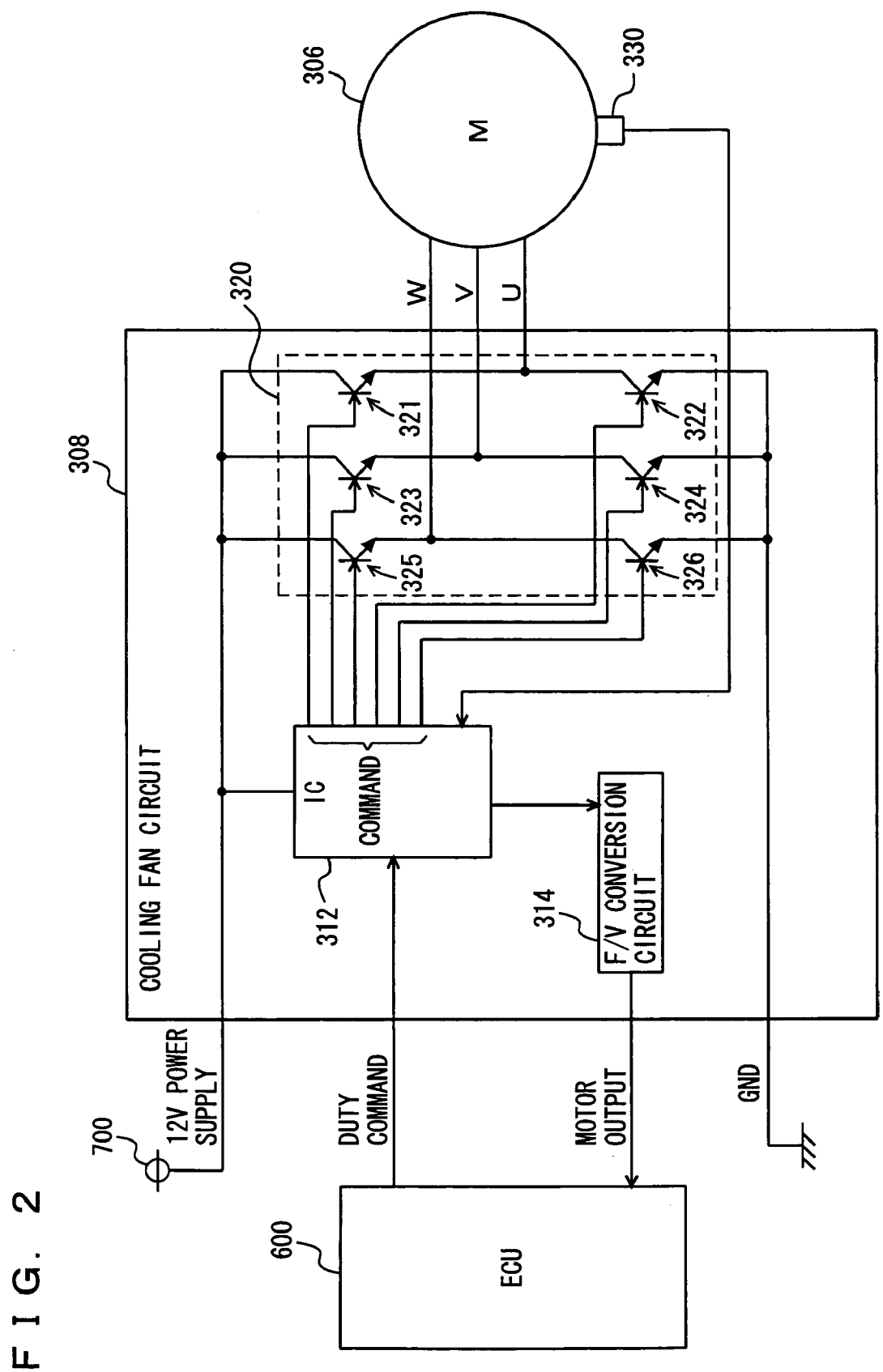
FIG. 2 is a control block diagram of a cooling fan circuit of the cooling device of a power supply according to the first embodiment of the present invention.

Cooling fan circuit 308 will further be described referring to FIG. 2. Since cooling fan circuits 408 and 508 are the same as cooling fan circuit 308, detailed descriptions thereof will not be repeated.

Cooling fan circuit 308 includes an IC (Integrated Circuit) 312, an F/V conversion circuit 314 and an inverter 320. IC 312 transmits a drive command signal to inverter 320 based on a DUTY command value (a DUTY ratio) D transmitted from ECU 600. F/V conversion circuit 314 converts a pulse signal (a frequency) transmitted from a speed sensor 330 provided on motor 306 into a voltage and transmits a signal representing the voltage to ECU 200. The voltage is a calculated value of a driving voltage of motor 306. The calculated value of the driving voltage is referred to as an output value V of motor 306.

Inverter 320 includes six transistors 321, 322, 323, 324, 325, and 326. Transistors 321 and 322 corresponding to a U phase are connected in series. Transistors 323 and 324 corresponding to a V phase are connected in series. Transistors 325 and 326 corresponding to a W phase are connected in series.

Each transistor is turned on/off with DUTY command value D set by ECU 600 according to the drive command signal transmitted from IC 312 to convert DC power supplied from an auxiliary battery 700 into AC power for supply to motor 306.

Figure 3:
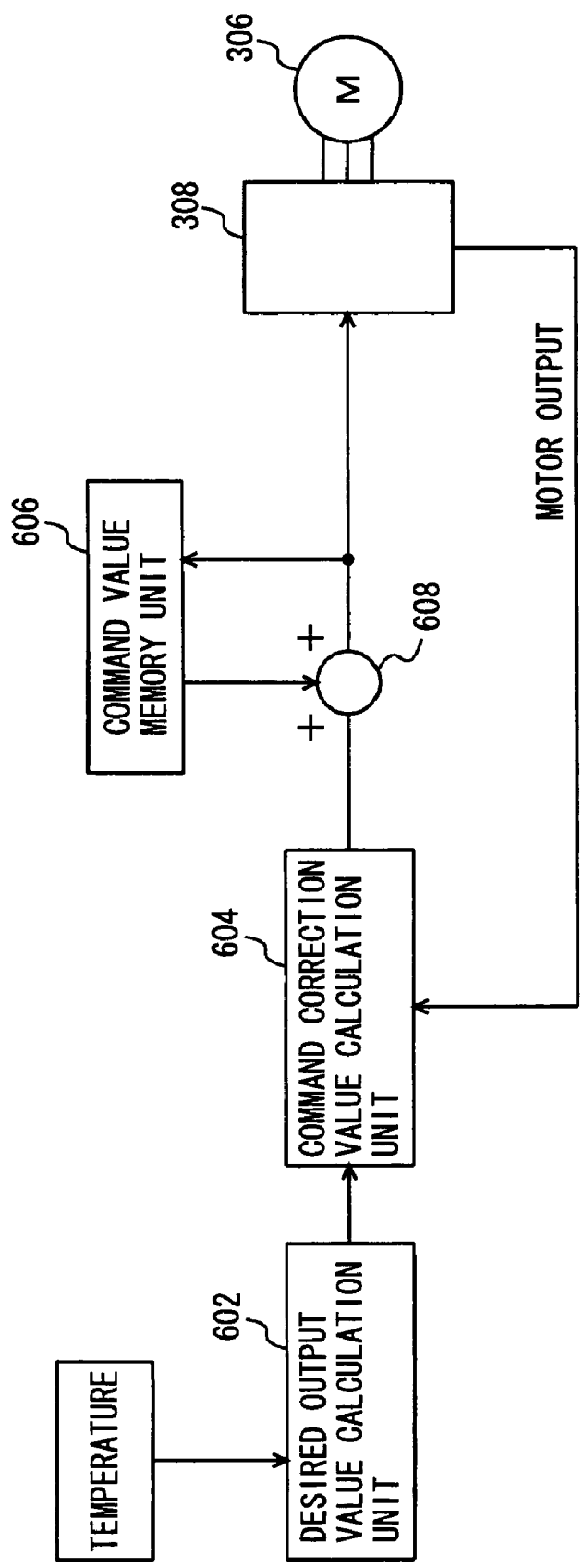
FIG. 3 is a control block diagram of an ECU of the cooling device of a power supply according to the first embodiment of the present invention.

ECU 600 will further be described referring to FIG. 3. ECU 600 includes a desired output value calculation unit 602, a command correction value calculation unit 604, a command value memory unit 606, and an adding unit 608.

Desired output value calculation unit 602 calculates a desired output value VT of each motor based on a temperature detected with each temperature sensor. Desired output value VT described here is a desired value of the driving voltage of the motor.

Desired output value VT is calculated based on a map stored in a memory (not shown). A number of maps set is equal to the number of the battery blocks. Desired output value VT is calculated to be a value which enables each cooling fan to supply cooling air required to cool each battery block at a detected temperature. Therefore, desired output value VT may differ for each motor even when the same temperature is detected because there are variations in a pressure loss in each battery block, properties of each cooling fan and each motor, and the like.

Command correction value calculation unit 604 calculates a correction value of DUTY command value D (hereafter referred to as a DUTY command correction value) based on a difference DV between desired output value VT and output value V of the motor (DV=VT−V). The DUTY command correction value is calculated for each motor based on an operation expression DDTDV×DV×INT/TAU+DGAIN×(DV−DVL).

Herein, DDTDV represents a DUTY conversion factor. INT represents a control period. TAU represents a correction gain time constant. DGAIN represents a correction differential term gain. DVL represents difference DV calculated last time.

As is obvious from the expression, the larger difference DV between desired output value VT and output value V is, the larger the DUTY command correction value becomes. DUTY command value D becomes larger as the DUTY command correction value increases, and thus a motor output becomes higher.

Command value memory unit 606 stores DUTY command value D previously calculated. Adding unit 608 adds a calculated DUTY command correction value to a last DUTY command value which is stored in command value memory unit 606 to calculate DUTY command value D. Calculated DUTY command value D is stored in command value memory unit 606 and, concurrently, transmitted to cooling fan circuit 308.

Figure 4:
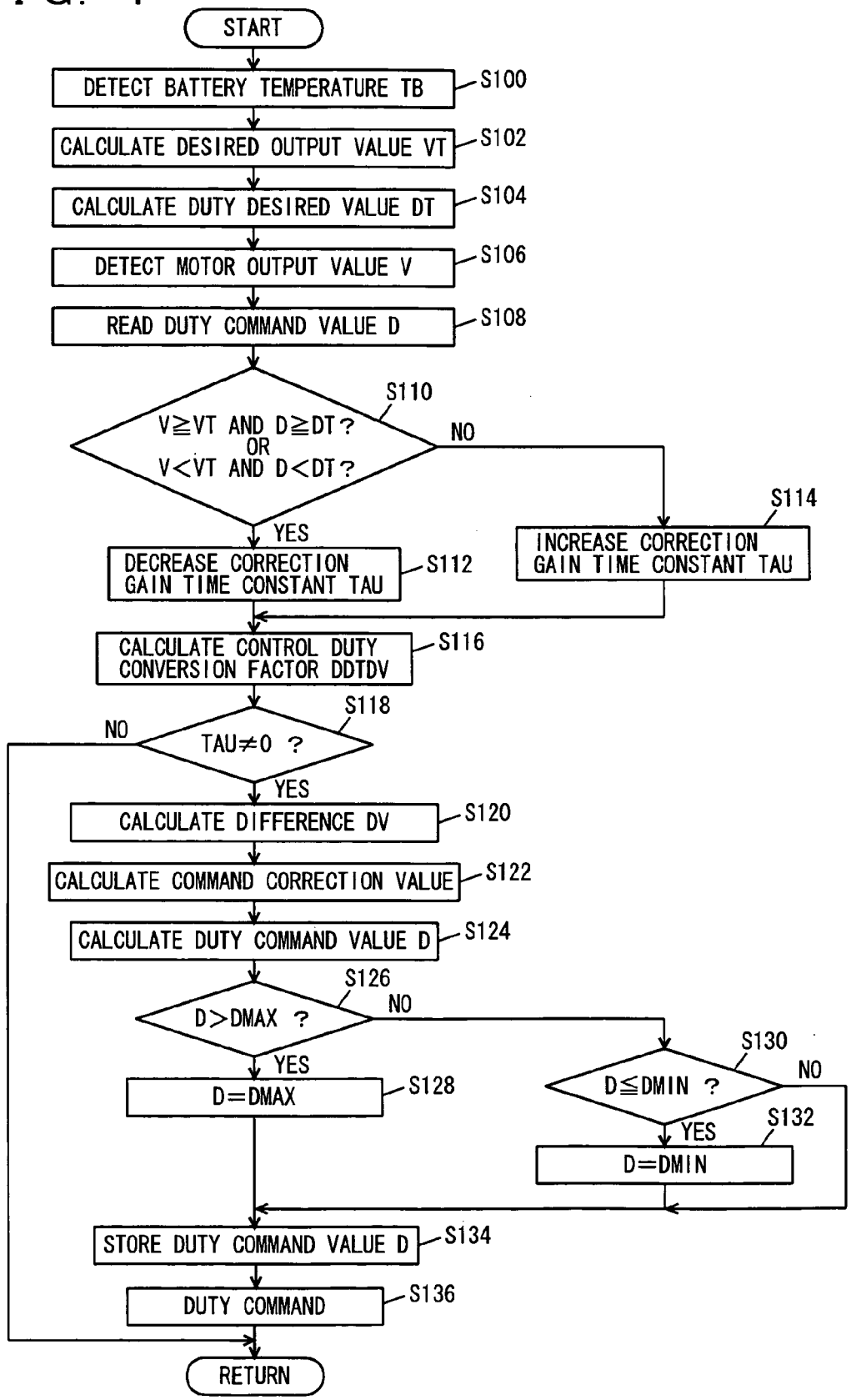
FIG. 4 is a flow chart of a control structure of a program executed by the ECU of the cooling device of a power supply according to the first embodiment of the present invention.

Referring to FIG. 4, a control structure of a program executed by ECU 600 of the cooling device of the power supply according to this embodiment will now be described.

In step 100 (hereafter, a "step" is abbreviated to "S"), ECU 600 detects a temperature TB of each battery block based on a signal transmitted from temperature sensor 310, 410, 510.

In S102, ECU 600 calculates desired output value VT of each motor based on the temperature of each battery block. Desired output value VT is calculated based on a map which is previously set according to experiments or the like and stored in the memory (not shown).

In S104, ECU 600 calculates a desired value DT of the DUTY command value for each motor based on calculated desired output value VT. Desired value DT is calculated based on a map which is previously set according to experiments or the like and stored in the memory.

In S106, ECU 600 detects output value V of each motor based on a signal transmitted from each F/V conversion circuit. In S108, ECU 600 reads DUTY command value D of the last time stored in command value memory unit 606.

In S110, ECU 600 determines as to whether one of two conditions, that is, a condition that output value V of the motor is at least desired output value VT and DUTY command value D is at least desired value DT, and a condition that output value V of the motor is less than desired output value VT and DUTY command value D is less than desired value DT, is satisfied or not. If one of the aforementioned conditions is satisfied (YES in S110), processing moves to S112. Otherwise (NO in S110), the processing moves to S114.

In S112, ECU 600 decreases correction gain time constant TAU. In S114, ECU 600 increases correction gain time constant TAU. In S116, ECU 600 calculates control DUTY conversion factor DDTDV for each motor based on output value V of each motor. Control DUTY conversion factor DDTDV may be calculated based on the map which is previously set according to experiments or the like.

In S118, ECU 600 determines as to whether correction gain time constant TAU is unequal to 0 or not. If correction gain time constant TAU is unequal to 0 (YES in S118), the processing moves to S120. Otherwise (NO in S118), the processing ends.

In S120, ECU 600 calculates difference DV between desired output value VT and output value V of each motor (DV=VT−V). In S122, ECU 600 calculates the DUTY command correction value for each motor. In S124, ECU 600 adds the calculated DUTY command correction value to the last DUTY command value D to calculate DUTY command value D.

In S126, ECU 600 determines as to whether the calculated DUTY command value D is larger than a previously set maximum value DMAX of DUTY command value D or not. If the calculated DUTY command value D is larger than maximum value DMAX (YES in S126), the processing moves to S128. Otherwise (NO in S126), the processing moves to S130. In S128, ECU 600 sets DUTY command value D to DMAX.

In S130, ECU 600 determines as to whether the calculated DUTY command value D is at most a previously set minimum value DMIN of DUTY command value D or not. If the calculated DUTY command value D is at most the previously set minimum value DMIN of DUTY command value D (YES in S130), the processing moves to S132. Otherwise (NO in S130), the processing moves to S134. In S132, ECU 600 sets DUTY command value D to DMIN.

In S134, ECU 600 stores DUTY command value D in command value memory unit 606. In S136, ECU 600 transmits DUTY command value D to cooling fan circuit 308.

Operations of ECU 600 in the cooling device of the power supply according to this embodiment based on the structure and flow chart as described above will now be described.

When a system of the vehicle is activated, temperature TB of each battery block is detected based on a signal transmitted from temperature sensor 310, 410, 510 (S100), and desired output value VT of each motor is calculated based on the detected temperature of each battery block (S102). Furthermore, DUTY desired value DT is calculated based on the calculated desired output value VT (S104).

To compare the calculated desired output value VT and DUTY desired value DT with output value V of each motor and present DUTY command value D, output value V of each motor is detected (S106) and DUTY command value D calculated last time is read (S108).

When output value V of the motor is at least desired output value VT and DUTY command value D is at least desired value DT (YES in S110), output value V of the motor is increasing beyond desired output value VT. In addition, when output value V of the motor is less than desired output value VT and DUTY command value D is less than desired value DT (YES in S110), output value V of the motor is decreasing below desired output value VT. In these situations, correction gain time constant TAU is decreased (S112). With this, an absolute value of the DUTY command correction value calculated based on the operation expression DDTDV×DV×INT/TAU+DGAIN×(DV−DVL) is increased.

On the other hand, when output value V of the motor is at least desired output value VT and DUTY command value D is less than desired value DT (NO in S110), output value V of the motor is decreasing toward desired output value VT. In addition, when output value V of the motor is less than desired output value VT and DUTY command value D is at least desired value DT (NO in S110), output value V of the motor is increasing toward desired output value VT. In these situations, correction gain time constant TAU is increased (S114). With this, the absolute value of the DUTY command correction value calculated based on the operation expression DDTDV×DV×INT/TAU+DGAIN×(DV−DVL) is decreased.

To calculate the DUTY command correction value corresponding to output value V of the motor, control DUTY conversion factor DDTDV for each motor is calculated based on output value V of each motor (S116), and a determination is made as to whether correction gain time constant TAU is unequal to 0 or not (S118).

If correction gain time constant TAU is 0 (NO in S118), it is impossible to calculate the DUTY command correction value because a denominator in the operation expression DDTDV×DV×INT/TAU+DGAIN×(DV−DVL) becomes 0. That is, calculation of the DUTY command correction value having an absolute value larger than the last-calculated DUTY command correction value cannot be performed to change DUTY command value D. Therefore, the DUTY command correction value is not calculated.

If correction gain time constant TAU is not 0 (YES in S118), difference DV between desired output value VT and output value V of each motor (DV=VT−V) is calculated (S120), and the DUTY command correction value for each motor is calculated (S122). The calculated DUTY command correction value is added to last DUTY command value D to calculate DUTY command value D (S124).

When difference DV between desired output value VT and output value V of the motor is a positive value, that is, when output value V is lower than desired output value VT, the DUTY command correction value becomes positive and DUTY command value D is increased. As a result, the driving voltage of the motor is increased and can be approximated to desired output value VT.

In this situation, the lower output value V of the motor is than desired output value VT (the larger difference DV is), the larger the DUTY command correction value and thus DUTY command value D become. Therefore, the driving voltage of the motor can be rapidly approximated to desired output value VT.

On the other hand, when difference DV between desired output value VT and output value V of the motor is a negative value, that is, when output value V is higher than desired output value VT, the DUTY command correction value becomes negative and DUTY command value D is decreased. As a result, the driving voltage of the motor is decreased and can be approximated to desired output value VT.

In this situation, the higher output value V of the motor is than desired output value VT (the smaller difference DV is), the smaller the DUTY command correction value and thus DUTY command value D become. Therefore, the driving voltage of the motor can be rapidly approximated to desired output value VT.

If calculated DUTY command value D is larger than maximum value DMAX (YES in S126), DUTY command value D is set to DMAX (S128), and if it is smaller than minimum value DMIN (YES in S130), DUTY command value D is set to DMIN (S132). If calculated DUTY command value D is at most maximum value DMAX (NO in S126) and larger than minimum value DMIN (NO in S130), DUTY command value D is set to the calculated value.

A new DUTY command value D is stored in command value memory unit 606 (S134), and a signal representing this DUTY command value D is transmitted from ECU 600 to each cooling fan circuit (S136).

As described above, the ECU of the cooling device of the power supply according to this embodiment calculates DUTY command value D for each motor based on the difference between desired output value VT of each motor and output value V obtained by conversion of the rotation number, so as to decrease the difference. With this, each motor can be controlled such that the driving voltage of each motor is set to desired output value VT. Therefore, each battery block can be cooled appropriately according to the temperature of the battery block. As a result, the temperature of each battery block can be accurately managed to eliminate a difference in temperatures of the battery blocks.

Second Embodiment

Figure 5:
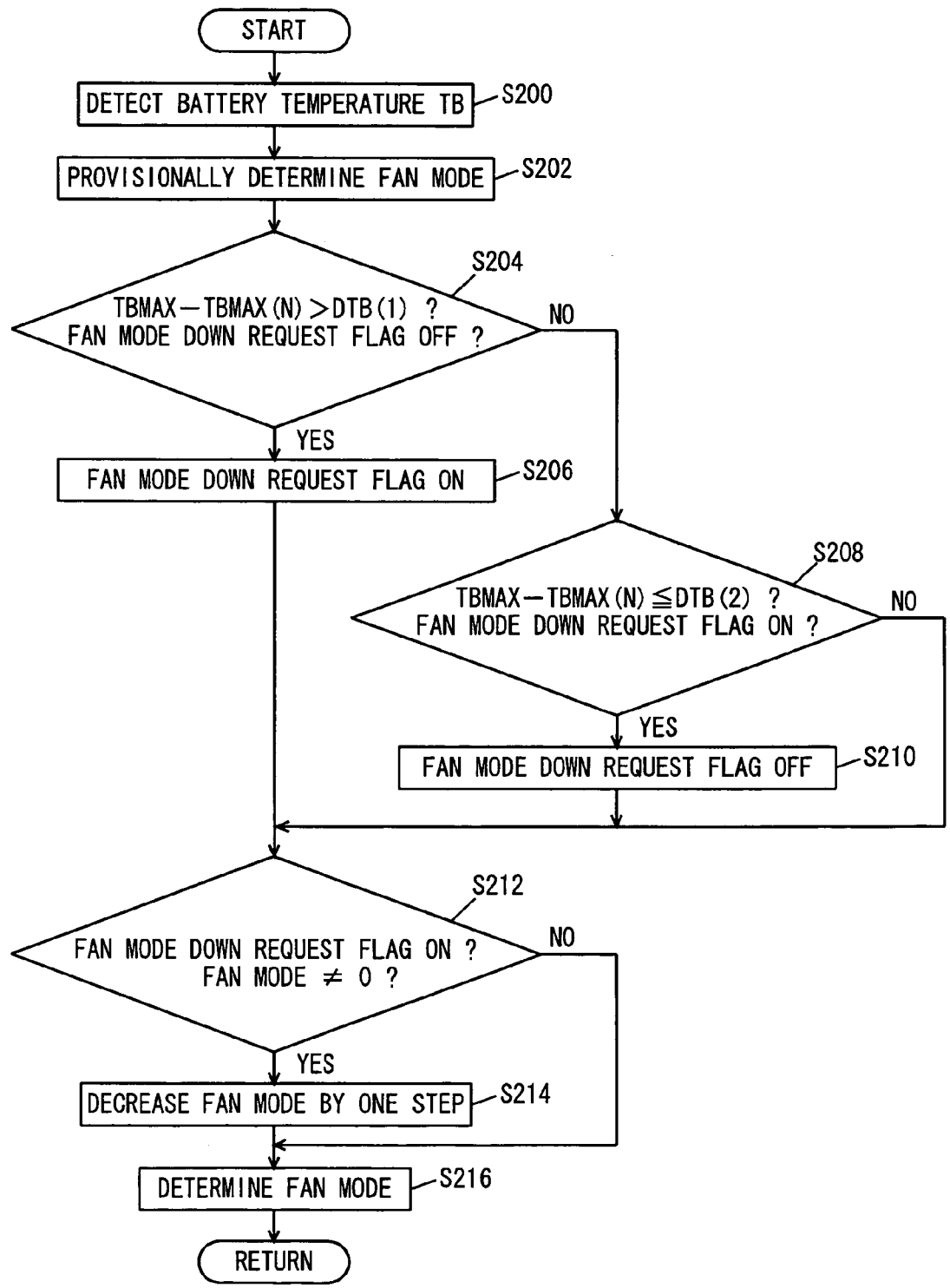
FIG. 5 is a flow chart of a control structure of a program executed by an ECU of a cooling device of a power supply according to a second embodiment of the present invention.

Referring to FIG. 5, a cooling device of a power supply according to a second embodiment of the present invention will now be described. In the first embodiment described above, each motor is controlled to approximate the driving voltage of each motor to each desired output value. In this embodiment, however, cooling of the battery block having a relatively low temperature is suppressed. The temperature sensor detects a temperature of each cell. Other structures and functions are the same as those described in the first embodiment. Therefore, detailed descriptions thereof will not be repeated here.

Referring to FIG. 5, a control structure of a program executed by ECU 600 of the cooling device of the power supply according to this embodiment will now be described. ECU 600 executes a program described below in addition to the program described above in the first embodiment.

In S200, ECU 600 detects a battery temperature TB based on a signal transmitted from each temperature sensor. A temperature of every cell is detected for battery temperature TB. It is to be noted that, in place of detection of a temperature of each cell, detection of a temperature of each module or every group of cells of a predetermined number may be performed.

In S202, ECU 600 provisionally determines a fan mode of each motor based on the detected temperature. The fan mode described here means the driving voltage of the motor. The fan mode is determined in a stepwise manner corresponding to the detected temperature, based on the map stored in the memory. The fan mode is increased as the temperature becomes higher.

In S204, ECU 600 determines as to whether a condition that a difference between a maximum temperature TBMAX of the detected temperature and a maximum temperature TBMAX(N) of a battery block other than the battery block including a cell having maximum temperature TBMAX is larger than a predetermined temperature difference DTB(1) and a fan mode down request flag is in an OFF state is satisfied or not. If the difference between maximum temperature TBMAX and maximum temperature TBMAX(N) is larger than predetermined temperature difference DTB(1) and the fan mode down request flag is in the OFF state (YES in S204), the processing moves to S206. Otherwise (NO in S204), the processing moves to S208. In S206, ECU 600 sets the fan mode down request flag to an ON state.

In S208, ECU 600 determines as to whether a condition that a difference between maximum temperature TBMAX and maximum temperature TBMAX(N) is at most a predetermined temperature difference DTB(2) (DTB(1)>DTB(2)) and the fan mode down request flag is in the ON state is satisfied or not. If the difference between maximum temperature TBMAX and maximum temperature TBMAX(N) is at most predetermined temperature difference DTB(2) and the fan mode down request flag is in the ON state (YES in S208), the processing moves to S210. Otherwise (NO in S208), the processing moves to S212. In S210, ECU 600 sets the fan mode down request flag to the OFF state.

In S212, ECU 600 determines as to whether a condition that the fan mode down request flag is in the ON state and a provisionally determined fan mode is unequal to 0 is satisfied or not. If the fan mode down request flag is in the ON state and the fan mode is unequal to 0 (YES in S212), the processing moves to S214. Otherwise (NO in S212), the processing moves to S216.

In S214, ECU 600 decreases the fan mode by one step for the motor provided on the battery block having the difference between maximum temperature TBMAX and maximum temperature TBMAX(N) larger than predetermined temperature difference DTB(1). In S216, ECU 600 determines the fan mode. The motor is driven with a voltage corresponding to the fan mode.

Operations of ECU 600 in the cooling device of the power supply according to this embodiment based on the structure and flow chart as described above will now be described.

When a vehicle system is activated, battery temperature TB is detected for each cell based on a signal transmitted from each temperature sensor (S200), and the fan mode of each motor is provisionally determined based on temperature TB (S202).

Assuming that the difference between maximum temperature TBMAX and maximum temperature TBMAX(1) of battery block 300 is larger than predetermined temperature difference DTB(1) and the fan mode down request flag is in the OFF state at present (YES in S204), it can be said that the temperature of battery block 300 is lower than the other battery blocks. Therefore, the fan mode down request flag is set to the ON state (S206). If the provisionally determined fan mode of motor 306 is unequal to 0 in this situation (YES in S212), the fan mode is decreased by one step (S214) and the fan mode is determined (S216). With this, cooling of battery block 300 having a relatively low temperature is suppressed.

If the difference between maximum temperature TBMAX and maximum temperature TBMAX(N) is at most predetermined temperature difference DTB(2) (NO in S204), on the other hand, it can be said that the difference in temperatures of battery blocks is small. If the fan mode down request flag is in the ON state in this situation (YES in S208), the fan mode down request flag is set to the OFF state (S210). Therefore, the fan mode is determined to be the provisionally determined fan mode (S216). This can avoid increase in the temperature difference due to unnecessary suppression of cooling of the battery block.

As described above, the ECU of the cooling device of the power supply according to this embodiment decreases the fan mode of the motor provided on the battery block having the difference between maximum temperature TBMAX and maximum temperature TBMAX(N) larger than predetermined temperature difference DTB(1). As a result, cooling of the battery block having a temperature lower than the other battery blocks can be suppressed to decrease the difference in temperatures of the battery blocks.

Third Embodiment

Figure 6:
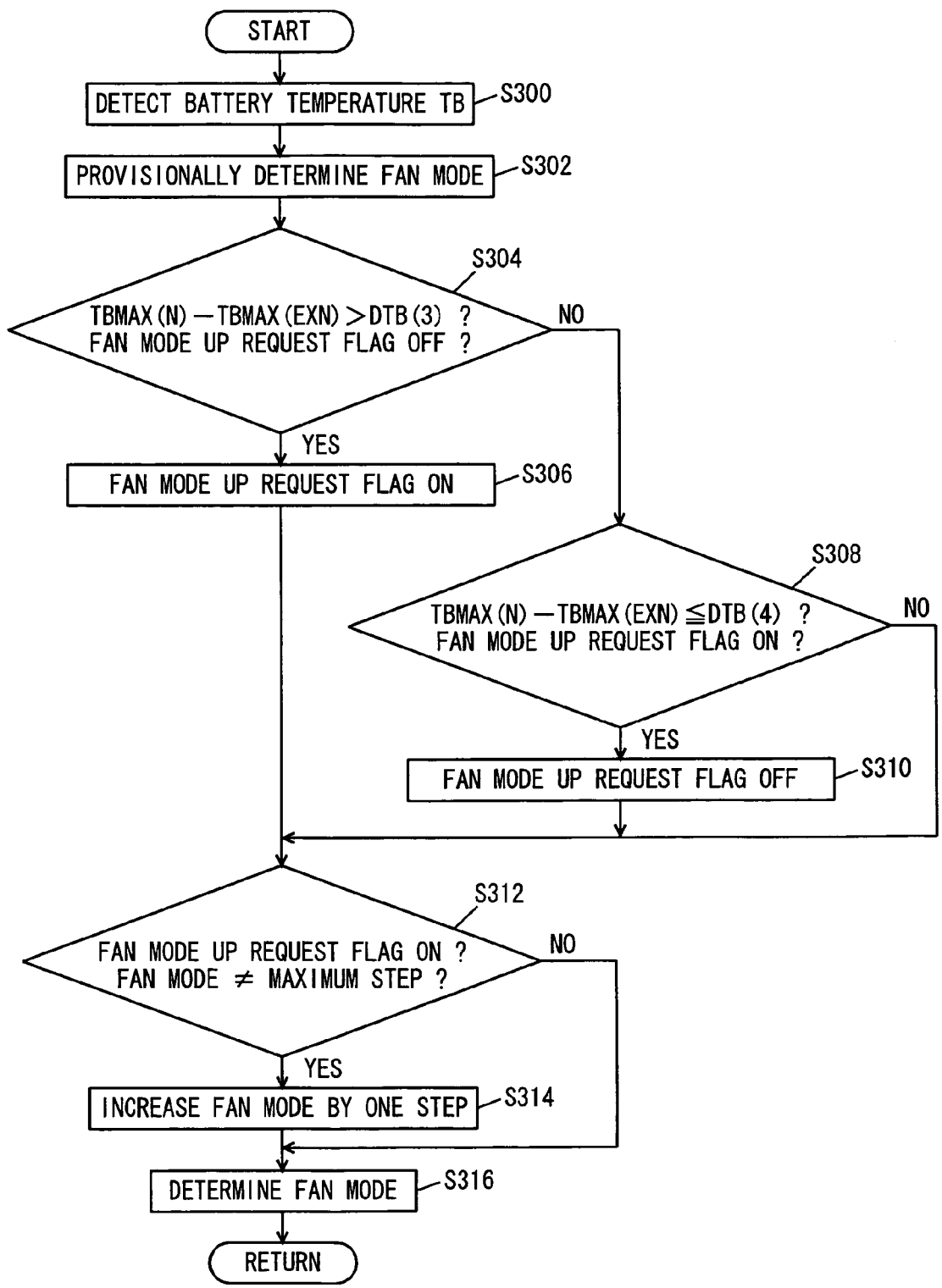
FIG. 6 is a flow chart of a control structure of a program executed by an ECU of a cooling device of a power supply according to a third embodiment of the present invention.

Referring to FIG. 6, a cooling device of a power supply according to a third embodiment of the present invention will now be described. In the first embodiment described above, each motor is controlled to approximate the driving voltage of each motor to each desired output value. In this embodiment, however, cooling of the battery block having a relatively high temperature is enhanced. The temperature sensor detects a temperature of each cell. Other structures and functions are the same as those described in the first embodiment. Therefore, detailed descriptions thereof will not be repeated here.

Referring to FIG. 6, a control structure of a program executed by ECU 600 of the cooling device of the power supply according to this embodiment will now be described. ECU 600 executes a program described below in addition to the program described above in the first embodiment.

In S300, ECU 600 detects battery temperature TB based on a signal transmitted from each temperature sensor. A temperature of every cell is detected for battery temperature TB. It is to be noted that, in place of detection of a temperature of each cell, detection of a temperature of each module or every group of cells of a predetermined number may be performed.

In S302, ECU 600 provisionally determines a fan mode of each motor based on the detected temperature. The fan mode described here means the driving voltage of the motor. The fan mode is determined in a stepwise manner corresponding to the detected temperature, based on the map stored in the memory. The fan mode is increased as the temperature becomes higher.

In S304, ECU 600 determines as to whether a condition that a difference between a maximum temperature TBMAX (N) in any of the battery blocks and a maximum temperature TBMAX(EXN) in the other battery blocks is larger than a predetermined temperature difference DTB(3) and a fan mode up request flag is in an OFF state is satisfied or not. If the difference between maximum temperature TBMAX(N) and maximum temperature TBMAX(EXN) is larger than predetermined temperature difference DTB(3) and the fan mode up request flag is in the OFF state (YES in S304), the processing moves to S306. Otherwise (NO in S304), the processing moves to S308. In S306, ECU 600 sets the fan mode up request flag to an ON state.

In S308, ECU 600 determines as to whether a condition that a difference between maximum temperature TBMAX (N) and maximum temperature TBMAX(EXN) is at most a predetermined temperature difference DTB(4) (DTB(3) >DTB(4)) and the fan mode up request flag is in the ON state is satisfied or not. If the difference between maximum temperature TBMAX(N) and maximum temperature TBMAX(EXN) is at most predetermined temperature difference DTB(4) and the fan mode up request flag is in the ON state (YES in S308), the processing moves to S310. Otherwise (NO in S308), the processing moves to S312. In S310, ECU 600 sets the fan mode up request flag to the OFF state.

In S312, ECU 600 determines as to whether a condition that the fan mode up request flag is in the ON state and a provisionally determined fan mode is unequal to a maximum step is satisfied or not. If the fan mode up request flag is in the ON state and the fan mode is unequal to the maximum step (YES in S312), the processing moves to S314. Otherwise (NO in S312), the processing moves to S316.

In S314, ECU 600 increases the fan mode by one step for the motor provided on the battery block having the difference between maximum temperature TBMAX(N) and maximum temperature TBMAX(EN) larger than predetermined temperature difference DTB(3). In S316, ECU 600 determines the fan mode. The motor is driven with a voltage corresponding to the fan mode.

Operations of ECU 600 in the cooling device of the power supply according to this embodiment based on the structure and flow chart as described above will now be described.

When a vehicle system is activated, battery temperature TB is detected based on a signal transmitted from each temperature sensor (S300), and the fan mode of each motor is provisionally determined based on temperature TB (S302).

Assuming that the difference between maximum temperature TBMAX(1) in battery block 300 and maximum temperature TBMAX(EX1) in battery blocks 400 and 500 is larger than predetermined temperature difference DTB(3) and the fan mode up request flag is in the OFF state at present (YES in S304), it can be said that the temperature of battery block 300 is higher than the other battery blocks. Therefore, the fan mode up request flag is set to the ON state (S306). If the provisionally determined fan mode of motor 306 is unequal to the maximum step in this situation (YES in S312), the fan mode is increased by one step (S314) and the fan mode is determined (S316). With this, cooling of battery block 300 having a relatively high temperature can be enhanced.

If the difference between maximum temperature TBMAX (N) and maximum temperature TBMAX(EXN) is at most predetermined temperature difference DTB(4) (NO in S304), on the other hand, it can be said that the difference in temperatures of battery blocks is small. If the fan mode up request flag is in the ON state in this situation (YES in S308), the fan mode up request flag is set to the OFF state (S310). Therefore, the fan mode is determined to be the provisionally determined fan mode (S316). This can avoid increase in the temperature difference due to excessive cooling of the battery block.

As described above, the ECU of the cooling device of the power supply according to this embodiment increases the fan mode of the motor provided on the battery block having the difference between maximum temperature TBMAX(N) and maximum temperature TBMAX(EXN) larger than predetermined temperature difference DTB(3). As a result, cooling of the battery block having a temperature higher than the other battery blocks can be enhanced to decrease the difference in temperatures of the battery blocks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cooling device of a power supply formed with a plurality of electricity storage blocks, comprising:
    a plurality of cooling fans respectively provided corresponding to said electricity storage blocks to supply a cooling medium to said electricity storage blocks;
    a plurality of motors respectively driving said cooling fans;
    temperature detection means for detecting a temperature of each of said electricity storage blocks;
    calculation means for calculating a desired value of a driving voltage of each of said motors based on said temperature of each of the electricity storage blocks detected;
    rotation number detection means for detecting a rotation number of each of said motors;
    operation means for performing an operation of a calculated value of the driving voltage of each of said motors based on said rotation number detected; and
    control means for controlling each of said motors based on a difference between said desired value and said calculated value.

2. The cooling device of a power supply according to claim 1, wherein
    said control means includes means for controlling each of said motors to make the driving voltage of each of said motors higher when the difference between said desired value and said calculated value is larger.

3. The cooling device of a power supply according to claim 1, further comprising
    means for suppressing the driving voltage of at least one of said motors provided corresponding to an electricity storage block having a temperature lower than at least one remaining electricity storage block of said plurality of electricity storage blocks.

4. The cooling device of a power supply according to claim 1, further comprising
    means for increasing the driving voltage of at least one of said motors provided corresponding to an electricity storage block having a temperature higher than at least one remaining electricity storage block of said plurality of electricity storage blocks.

5. A cooling device of a power supply formed with a plurality of electricity storage blocks, comprising:
    a plurality of cooling fans respectively provided corresponding to said electricity storage blocks to supply a cooling medium to said electricity storage blocks;
    a plurality of motors respectively driving said cooling fans;
    a temperature detection unit detecting a temperature of each of said electricity storage blocks;
    a calculation unit calculating a desired value of a driving voltage of each of said motors based on said temperature of each of the electricity storage blocks detected;
    a rotation number detection unit detecting a rotation number of each of said motors;
    an operation unit performing an operation of a calculated value of the driving voltage of each of said motors based on said rotation number detected; and a control unit controlling each of said motors based on a difference between said desired value and said calculated value.

6. The cooling device of a power supply according to claim 5, wherein said control unit controls each of said motors to make the driving voltage of each of said motors higher when the difference between said desired value and said calculated value is larger.

7. The cooling device of a power supply according to claim 5, wherein said cooling device suppresses the driving voltage of at least one of said motors provided corresponding to an electricity storage block having a temperature lower than at least one remaining electricity storage block of said plurality of electricity storage blocks.

8. The cooling device of a power supply according to claim 5, wherein said cooling device increases the driving voltage of at least one of said motors provided corresponding to an electricity storage block having a temperature higher than at least one remaining electricity storage block of said plurality of electricity storage blocks.

* * * * *

UNITED STATES PATENT AND TRADEMARK OFFICE
CERTIFICATE OF CORRECTION

PATENT NO.         : 7,102,310 B2                                         Page 1 of 1
APPLICATION NO. : 11/108881
DATED              : September 5, 2006
INVENTOR(S)        : Teruo Ishishita It is certified that error appears in the above-identified patent and that said Letters Patent is hereby corrected as shown below:

| Column | Line |   |
|---|---|---|
| 11 | 21 | Change "TBMAX(EN)" to --TBMAX(EXN)--. |

Signed and Sealed this

Fifth Day of December, 2006

JON W. DUDAS
*Director of the United States Patent and Trademark Office*